United States Patent [19]

McNaney

[11] 4,330,178

[45] * May 18, 1982

[54] ILLUMINATED SUBJECT MATTER IMAGE DISSECTING AND ELEMENTAL LIGHT OUTPUT ALIGNMENT CONTROL MEANS

[76] Inventor: Joseph T. McNaney, 8548 Boulder Dr., La Mesa, Calif. 92041

[*] Notice: The portion of the term of this patent subsequent to Dec. 23, 1997, has been disclaimed.

[21] Appl. No.: 89,217

[22] Filed: Oct. 29, 1979

[51] Int. Cl.³ .................................................. G02F 1/11
[52] U.S. Cl. ................................................... 350/358
[58] Field of Search .......................................... 350/358

[56] References Cited

U.S. PATENT DOCUMENTS

| | | | |
|---|---|---|---|
| 3,676,592 | 7/1972 | Foster | 350/358 |
| 3,713,721 | 1/1973 | Watson | 350/358 |
| 4,093,976 | 6/1978 | Das | 350/358 |
| 4,240,715 | 12/1980 | McNaney | 350/358 |

Primary Examiner—William L. Sikes

[57] ABSTRACT

The invention relates to optical systems incorporating means for dissecting a formation of light stemming from illuminated subject matter at one location within a telecommunications system and thereupon establishing a series of elemental light spot information for transmission to a second location for use in a reconstructing of an image of the initially illuminated subject matter.

3 Claims, 2 Drawing Figures

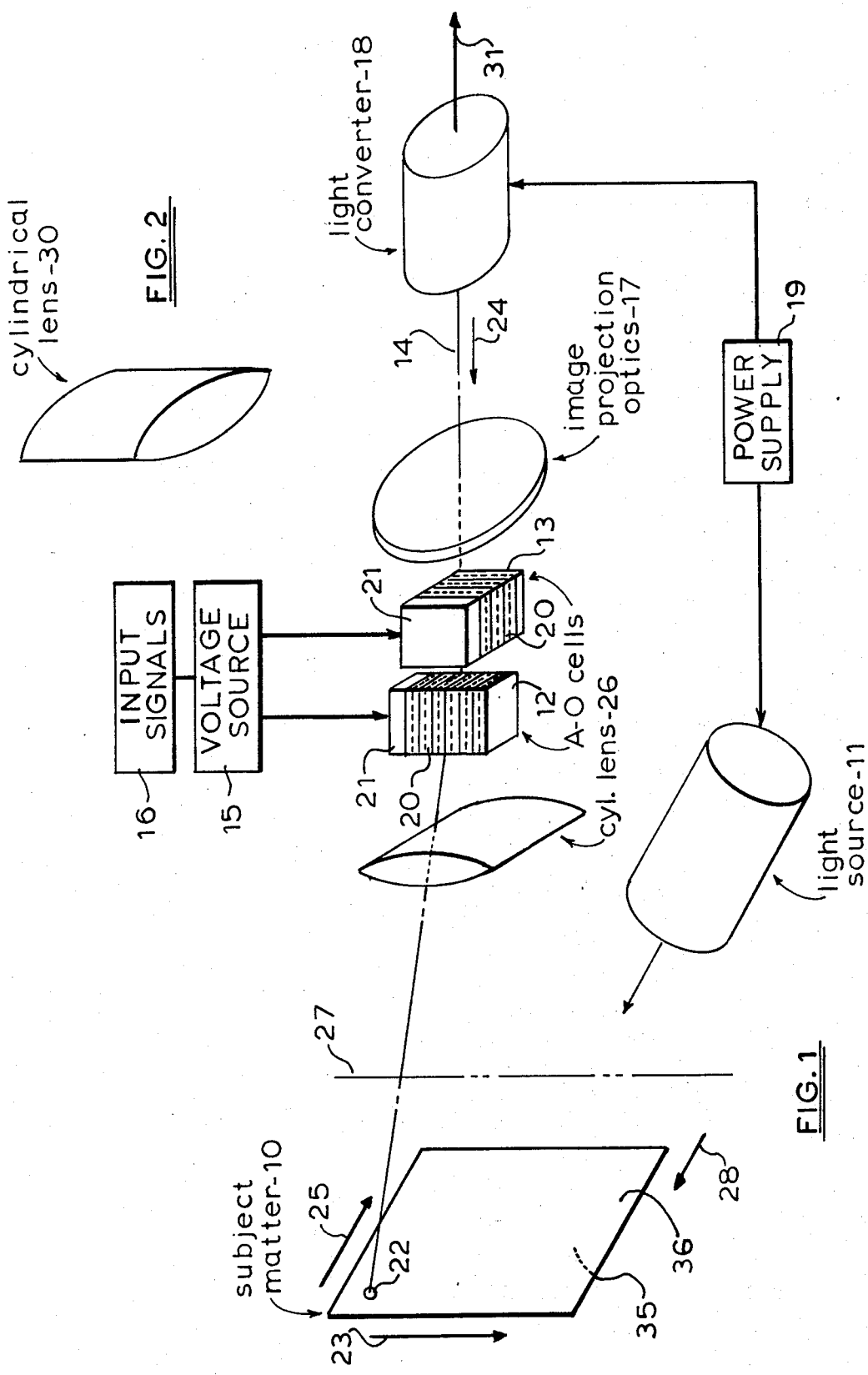

4,330,178

ILLUMINATED SUBJECT MATTER IMAGE DISSECTING AND ELEMENTAL LIGHT OUTPUT ALIGNMENT CONTROL MEANS

SUMMARY OF THE INVENTION

The invention herein includes the use of acousto-opic light deflector means for dissecting a formation of light of illuminated subject matter and deriving therefrom a series of elemental light spot information whereby light images of such information will have been made available for selective viewing from along a common optical axis of the system, and by means of image projection optics along the optical axis the light images of such information will then be viewed from along this optical axis for a further handling thereof within the system.

An object of the invention, therefore, is to effect a dissecting of a light pattern representative of subject matter at an optical information point of transmission of a data handling system utilizing solid state light optic means. A further object is to include therein the use of acousto-optic light reflector means as an electrically actuated directionally controllable cylindrical telescope in the process of viewing, selectively, predetermined and minute portions of illuminated subject matter.

BACKGROUND OF THE INVENTION

This invention relates to a co-pending application Ser. No. 955,111 filed Oct. 26, 1978, now U.S. Pat. No. 4,179,689, issued Dec. 18, 1979 wherein the illuminated subject matter is representative of an array of graphic symbol beam forming means and from which images of symbols are derived for recordings thereof at the surface of a graphic symbol display medium.

BRIEF DESCRIPTION OF THE DRAWING

FIG. 1 is a schematic representation of an embodiment of the invention wherein a system of X and Y acousto-optic light reflector means are utilized in meeting the objectives herein set forth;

FIG. 2 is the showing of a cylindrical lens which will be referred to in descriptions of further embodiments of the invention.

DESCRIPTION OF THE INVENTION

The schematic diagram of FIG. 1 includes the showing of what will be referred to as subject matter 10 illuminated from a light source 11. Acousto-optic light reflector means includes the use of acousto-optic cells 12 and 13 positioned along a common optical axis 14 of the system and a source of ultrasonic frequency voltages 15 under the control of input signals 16. Following the A-O cells along the axis 14 there is provided a system of image projection optics 17, followed by light converter means 18. Operating voltage for the light source 11 and the light converter 18 can be obtained from a power supply 19.

The subject matter 10 can be understood as being, for example, a sheet of printed matter illuminated by means of a light source 11 which can be in the form of a laser source of radiant energy, for example, but not limited in this regard. Instead of being a sheet of printed matter the subject matter 10 can extend to the inclusion of an indoor or outdoor scene, people, etc., and what will be herein referred to as light can extend from infrared, through the visible spectrum, to ultraviolet.

Each of the A-O cells 12 and 13 include an interaction medium 20 and a transducer 21 to which voltages from the source 15 will be connected. When responding to signals including ultrasonic frequency voltages the interaction medium 20 is traversed by compression waves effecting periodic stratification of the medium, their density being proportional to applied acoustic power. The distance between two successive planes of maximum density is equal to the wavelength of a given voltage. The position of the cells along the optical axis 14 of the system and the orientation of a given strata agree with Bragg angle requirements relative to the O-order path of light rays through the medium 20. Under these conditions the periodic stratification of the medium allows it to behave like a multiplicity of mirrors, or refractors of light, each contributing to the bending of a light path through the medium 20, the degree of vending being related to the frequency of the voltage.

In response to ultrasonic frequency voltages available from the source 15, and selectively extended to the transducers 21 of the A-O cells under the control of signals 16, any of a number of different acoustic wave light reflecting conditions can be established within the interaction medium 20 of the cell 12 and/or cell 13. The establishing of predetermined ones of these light reflecting conditions in the medium 20 of both cells can provide an optical path extending from along the optical axis 14, in the direction of arrow 24, through the image projection optics 17 and media 20 of the cells for the viewing of an elemental light spot area of information 22 of the illuminated subject matter 10. The establishing of another predetermined one of the light reflecting conditions in, for example, medium 20 of the cell 12, will effect a change in the optical path through the cell 12 for the viewing of another elemental light spot area of information from along the optical axis 14, this other light spot information stemming from an area that is immediately adjacent the area 22 in the direction of arrow 23. Or, instead of establishing another predetermined one of the light reflecting conditions in medium 20 of the cell 12, the establishing of another predetermined one of the light reflecting conditions in the medium 20 of the cell 13, will effect a change in the optical path through the cell 13 for the viewing of another elemental light spot area of information from along the optical axis 14, this other light spot information stemming from an area that is immediately adjacent the area 22, but in the direction of the arrow 25.

The establishing of a series of individual light reflecting conditions in the medium 20 of cell 12, therefore, will effect, one after the other, corresponding optical path changes through the medium 20 of cell 12 and an availability for viewing from along the axis 14 a series of elemental light spot areas of information extending in a line across the subject matter 10 from area 22 in the direction of arrow 23. The establishing of a second series of individual light reflecting conditions in the medium 20 of cell 12, but followed by a second light-reflecting condition in the medium 20 of cell 13, will result in an availability for viewing from along the axis 14 a second series of elemental light spot areas of information extending along a second line across the subject matter 10 in the direction of arrow 23.

Each said establishing of a light reflecting condition in an interaction medium 20 can include the linear frequency modulation of the input voltages, which involves the presenting of a predetermined range of ultrasonic frequency voltages across the aperture of the cell, whereby the frequency change increases with time, and which produces a focussing on a given elemental light spot area of information. The medium 20 of each A-O cell is thereby made to function as a directionally controllable light spot viewing lens system in combination with the image projection optics 17. But, in the absence of linear frequency modulation of the input voltages, a cylindrical lens 26 oriented and positioned to cooperate with the A-O cell 12, and a similar lens (not shown) oriented and positioned to cooperate with the A-O cell 13, can be utilized in the system to produce the focussing on each elemental light spot area of information. In either case, each area of information, stemming from a normally off-axis position, is made available for viewing along the common optical axis 14 of the system.

As hereinbefore stated, the illuminated subject matter 10 can be understood as being a sheet of printed matter, or a scene, but is not to be limited in this regard since illuminated subject matter 10 can include a film material containing an array of graphic symbol shaped windows illuminated from the opposite side 35 by means of a repositioned light source 11. Or, predetermined formations of light can be projected on the surface 36 from a source of light 11. Or, illuminated subject matter 10 can take the form of an excited screen of a cathode ray tube as a further example.

The use of additional optical means (not shown) can be included between the subject matter and the A-O cells in providing an optical image at an intermediate image plane 27, which can be an enlarged, or a reduced, image of the illuminated subject matter, and which will be dissected as hereinbefore described.

When, for example, the subject matter 10 is in the form of a printed document and movable in a controlled manner in the direction of the arrow 28, the A-O cell 13 can then be replaced with a cylindrical lens optic means 30, for example, shown in FIG. 2.

The light converter 18 can include such light-to-electrical effect converter means as photovoltaic or photoconductive devices, or the like, or preferably the photoelectric multiplier tube means. Such converter means will be designed to provide the transforming of a given light intensity, appearing at any given moment along the optical axis 14, into a corresponding electrical signal at the output circuit means 31 of the converter 18.

It should be understood by those skilled in the arts pertaining to the construction and application possibilities of the invention herein set forth that the invention includes other modifications and equivalents as they may be seen by those skilled in the arts, but still being within the scope of the appended claims.

I claim:

1. In an image projection and optical axis alignment control system,
   (a) a source of light representative of illuminated graphical information;
   (b) at least one acousto-optic light reflector having an acoustic-wave generator and an acoustic-optic interaction medium, said information and said medium positioned along a common optical axis of said system;
   (c) a source of ultrasonic frequency voltages and circuit means for controlling a connecting of individual voltages from said source to said generator for an establishing of corresponding acoustic wave light reflecting conditions within said medium and an effecting of optical path relationships, respectively, between selected portions of said information and said optical axis;
   (d) means for connecting a series of individual voltages from said source to said generator and an establishing of a corresponding series of said light reflecting conditions within said medium, said light reflecting conditions providing optical path relationships, respectively, between a series of predetermined portions of said information and said optical axis and an alignment of an optical image of each said portion with said optical axis.

2. The invention as set forth in claim 1 including additionally a light-to-electrical effect converter positioned along said optical axis for receiving said optical image of each said portion and providing corresponding electrical signals at an output circuit thereof.

3. The invention as set forth in claim 2 including additionally a lens system positioned along said optical axis intermediate said interaction medium and said converter for projecting said optical image of each said portion along said axis toward said converter.

* * * * *